United States Patent [19]

Bronnenberg et al.

[11] Patent Number: 5,479,269

[45] Date of Patent: Dec. 26, 1995

[54] AUTOMATED FORM HANDLING AND GENERATING SYSTEM AND A FORM SHEET ASSOCIATED TO SAID SYSTEM

[75] Inventors: Wilhelmus J. H. J. Bronnenberg; Petrus A. M. Den Haan, both of Eindhoven, Netherlands

[73] Assignee: U.S. Philips Corporation, New York, N.Y.

[21] Appl. No.: 273,670

[22] Filed: Jul. 12, 1994

Related U.S. Application Data

[62] Division of Ser. No. 53,947, Apr. 26, 1993, Pat. No. 5,386,298.

[30] Foreign Application Priority Data

Apr. 27, 1992 [EP] European Pat. Off. .............. 92201169

[51] Int. Cl.⁶ .............................. H04N 1/00; G06K 19/06
[52] U.S. Cl. .......................... 358/403; 358/406; 358/468; 382/317; 235/375; 235/494
[58] Field of Search ..................................... 358/403, 440, 358/468, 406, 402, 407, 448; 382/317; 235/375, 456, 494

[56] References Cited

U.S. PATENT DOCUMENTS

| | | | |
|---|---|---|---|
| 4,300,123 | 11/1981 | McMillin et al. ...................... | 382/317 |
| 4,352,012 | 9/1982 | Verderber et al. ...................... | 235/487 |
| 4,589,144 | 5/1986 | Namba ...................................... | 382/317 |
| 4,933,984 | 6/1990 | Nakano et al. ......................... | 382/317 |
| 5,115,374 | 5/1992 | Hongoh .................................. | 361/393 |
| 5,140,139 | 8/1992 | Shepard ................................. | 382/317 |
| 5,204,515 | 4/1993 | Yoshida .................................. | 382/317 |
| 5,267,303 | 11/1993 | Johnson et al. ......................... | 358/468 |
| 5,282,052 | 1/1994 | Johnson et al. ......................... | 358/468 |
| 5,386,298 | 1/1995 | Bronnenberg et al. ................. | 358/403 |
| 5,418,865 | 5/1995 | Bloomberg ............................. | 382/317 |

Primary Examiner—Scott A. Rogers
Attorney, Agent, or Firm—Anne E. Barschall

[57] ABSTRACT

A document handling system comprises physical presentation means for receiving, presenting, and removing a document with respect to the system. Furthermore, it is provided with scanning memos for the document and printing means for printing on an unprinted sheet a document that contains a form. The form contains a plurality of physically sparse format calibrating items at a perimeter of the form, directly machine-readable form identifier clam in a prescribed identifier field, and form content dam including user completable indicia boxes proper to the form so identified. The form can be used for generating a facsimile sheet inclusive of standard facsimile header, for generating a standard document for general use, or for allowing a user to input amending dam for inclusion into a later to be printed user specifiable document.

14 Claims, 7 Drawing Sheets

Smart Fax List Send Form no: 715480637/2003473847

- ☐ WIM BRONN
- ☐ MARCEL V T
- ☐ MARC C TH
- ☐ MARC C WRK
- ☐ HUIB EGGEN
- ☐ JAN DE BIE
- ☐ CHRIS KOLL
- ☐ W COOLEN
- ☐ J BERKHOFF
- ☐ K GEHRELS

- ☐ ROB DE V
- ☐ JOEL MINOT
- ☐ PH GENTRIC
- ☐ THUIS
- ■ PIZZ AALST
- ☐ CHIN AALST

Pages (including this one): [1] — 50
Fine: ☐ — 52

Message/Remarks:

*Kan ik voor zondagavond, 1-9, een tafel voor 6 personen reserveren, om 19.30 uur?*

*Bij voorbaat dank,*

*P. den Haan*

Smart Fax Address Specification Form

Existing List Abbbrev.: ☐☐☐☐☐☐☐☐☐☐ — 60

New List Abbrev.: |V| |B|O|C|H|O|V|E|N| — 62

New Fax Number:
|0|9|4|3| |1|6|0|1|0|4|4|7|7|0| — 64

New Name:
|G| |V|A|N| |B|O|C|H|O|V|E|N| | | | | | | | | — 66

New Address/Organisation:
|B|U| |F|A|X| | | | | | | | | | | | | | | | | | | — 68
|E|F|W| |M| | | | | | | | | | | | | | | | | | | |
|G|U|T|H|E|I|L| |S|C|H|O|D|E|R| |G|A|S|S|E| |1|0| |
|1|1|0|2| |V|I|E|N|N|A| | | | | | | | | | | | | |
|A|U|S|T|R|I|A| | | | | | | | | | | | | | | | | |

FIG. 5

Smart Fax Direct Send Form

Fax no.: |0|2|0| |6|6|5|2|1|5|7| | | |—80

Pages (including this one): |1|—82
Fine: ■—84

—86

To: Mr. M. J. Janssens
Tec Nederland
Amsterdam

Message/Remarks:

Kunt u mij verdere telefonische informatie m. b. t.
de TEC FAX is toesturen?
Bij voorbaat hartelijk dank, P. den Haan

FIG. 7

PHILIPS

Philips Research

*Smart Fax Message*

From    Name:      P. den Haan      Address:    Way1.061
Philips Research Labs
         Fax number:    +31-40-744004        P.O. Box 80.000
         Phone number: +31-40-744219        5600 JA Eindhoven
The Netherlands To:    Fax: 020 6652157      Pages:    1      Date: Fri Aug 30 13:27:23 1991

To: *Mr. M. J. Janssens*
*Tec Nederland*
*Amsterdam*

Message/Remarks:

*Kunt u mij verdere telefonische informatie m. b. t.*

*de TEC FAX is toesturen?*

*Bij voorbaat hartelijk dank,*

*P. den Haan*

AUTOMATED FORM HANDLING AND GENERATING SYSTEM AND A FORM SHEET ASSOCIATED TO SAID SYSTEM

This is a division of application Ser. No. 08/053,947 filed Apr. 26, 1993, now U.S. Pat. No. 5,386,298.

FIELD OF THE INVENTION

The invention relates to a form handling system, comprising acceptance means for physically accepting a form sheet with respect to said system and optical scanning means for scanning said form sheet. A form as herein defined is organized as a sheet of substantially fixed standard dimensions, carrying an amount of standard information by means of printing or the like, and furthermore allowing for addition of human produced information that may or may not obey strict formatting prescriptions. Physical form handling devices are in wide use, such as for reading cheques. Automated handling of forms generally requires a considerable investment, especially in equipment. The present invention envisages to bring such form handling apparatus down in costs to an affordable level that is comparable to that of a personal computer.

By itself, one particular application of low cost handling of unformatted pages has been realized by so-called personal facsimile devices. Their use is threefold, first, for transmitting one or more pages to a prespecified destination, second, for receiving such transmitted pages from an initiating source, and, third, for locally copying a page that is physically presented to the device. Low cost optical scanning combined with data storing and processing features on a level comparable to a personal computer would represent a convenient appliance, even in a stand-alone application.

SUMMARY OF THE INVENTION

Therefore, amongst other things, it is an object of the present invention to provide a system of the type set fourth in the field of the invention with various features, in particular recognizing features for realizing an accurate and automated form processing system. Now, according to one of its aspects, the object is realized in that the invention is characterized in that said system comprises form processing means including data processing means and data storage means interconnected to said scanning means, wherein said form processing means comprise:

first recognizing means for detecting a plurality of physically sparse format calibrating items at a perimeter of said form and measuring separation between said items;

second recognizing means fed by said first recognizing means for detecting and recognizing directly machine-readable form identifier data in a prescribed identifier field of said form;

third recognizing means fed by said first and second recognizing means for locating one or more user indicia boxes proper to the form so identified and forwarding indicia data of those indicia boxes for processing by said data processing means.

The format calibrating items allow accurate evaluation of the dimensions of the part of the form actually read-out. Their being sparse and at the perimeter means that little space is occupied, which moreover is at a place that is little used by the form's contents. The items are relatively far from each other, which makes the measurement accurate. The identifier dam is directly machine-readable, which allows every category of form to be easily distinguished with respect to other form categories. As shown hereinafter, a bit string is a very good solution that furthermore allows for built-in security, such as error correction/detection. This means that the system will generally do a correct identification of the form in question. Once the form has been identified properly, the system through its software knows where to expect user indicia boxes, and what type of indicia to expect.

Advantageously, said system allows ascertaining of both indiscriminate marks in mark indicia boxes as well as specific characters in character indicia boxes proper to the form so identified. The mark box(es) can be filled in by humans according to very broad criteria. Machine ascertaining as to whether such filling in has really been effected is extremely reliable and can be used in any case where a yes/no decision must be taken. In a more complex environment, recognition of human-inserted characters in one or more character boxes is better suited, wherein always a character is recognized as an element of a set that is prespecified for the character box in question (digits, alphanumerical, more extended): character recognition by itself is now a mature art. A marker box array allows for selective marking that is little sensitive against interference and can be used for various different control selection schemes in an administrative and/or physical environment. Character boxes can be used for area effective inputting of data such as names, amounts, etcetera.

Advantageously, the system has transfer means fed by said first and second recognizing means for recognizing one or more copy boxes each in a respective copy box field proper to the form so identified and directly transferring any scanned information therefrom to said data storage means. The provision of such copy boxes would allow storage of information that needs no machine interpretation. Any type of form could now have specific user indicia levels of machine sophistication, and dependent on the actual application. A different example of use may, for example be the verification of human signatures. Generally, the software of the application in question determines where to look for particular boxes and what to do with any content found. The inventive thought allows the user to design his own type of form.

By itself, U.S. Pat. No. 4,352,012 describes a header sheet for an image communication system that contains various mark fields which can be user indicated to specify facsimile destination and budget centre. The present invention recognizes that the user-specifying as narrowly disclosed in the reference can be extended to many other form handling environments through addition of some machine intelligence, so that the automatic generation of such documents is facilitated. Further, the form identifier allows easy distinction among a host of different forms. Moreover, the various types of user indicia boxes offer a flexible user interface of wide capabilities.

Advantageously, said first recognizing means recognize at least four format calibrating items substantially at respective extremities of a fractional subform of said form. Two calibrating items may allow measurement of magnification variation in one direction and, furthermore, rotation and translation. The use of at least four calibrating items, for example at the corners of a rectangle, allows measurement of a broader range of distortions, such as linear skew. The items must not be too far from each other, if the influence of non-linear distortions could diminish accuracy. The subform would contain e.g., boxes that need accurate scrutinizing; the remainder of the form may contain copy boxes or explanatory information.

Advantageously, the system has printing means for printing such form conforming to internally stored information in said device for so realizing a said form sheet that is subsequently acceptable to said device. This allows printing of forms that can be defined by a user and, with or without subsequent human-executed completion used in the intended application on a data processing or controlling level.

Advantageously, said data processing means are arranged for upon processing said user indicia data therefrom deriving change data to said internally stored information. This allows for easily changing a form without accessing by any keyboard being necessary.

Advantageously, said data processing means are arranged for updating, through said change data, said internally stored information as a directory, of which a particular directory item is thereupon selectable through a further user indicium on an associated directory select form. This allows smooth set-up of a directory that can later be quickly selected. The field of use of such a directory can be manifold: it may contain telephone extension numbers, parts lists, items to be checked in a medical check-up, and many others.

Advantageously, the system has transfer means fed by said first and second recognizing means for recognizing a particular copy box field proper to the form so identified and transferring any scanned information therefrom to a facsimile attachment means for attachment to a facsimile network, said system having reformatting means for converting a particular detected mark from a mark box specifier array to an associated pre-specified destination address for said scanned information. The addition of facsimile transmission adds utility, and the addressing by means of a mark is a very versatile feature.

Now, the system may be realized as a self-contained unit that has all the features on-board that are necessary. On the other hand, the system may be distributed. The optical scanning may be on a first location, whereas the data processing on a second location, and the printing on a third location. Alternatively, scanning and data processing are maybe colocated. A still different organization is that part of the data processing, e.g. the recognition of the form type and the ascertaining of the marker boxes, is colocated with the scanner, whereas more complicated functions are processed remotely, such as OCR. Various other configuration types are possible.

The invention also relates to a form sheet as generated by a system according to the foregoing and to a form sheet for use by such a system.

Various attractive aspects have been recited in dependent Claims.

BRIEF DESCRIPTION OF THE FIGURES

Various aspects and advantages of the invention are hereinafter discussed in detail with respect to preferred but non-limitative embodiments that are disclosed with respect to the following Figures. In particular, the disclosure assumes a facsimile transmission environment. However, various other fields of use are open to the invention as amply stipulated in the disclosure. Now.

FIG. 3 shows a typical SmartFax List Send form;

FIG. 5 shows a typical Address Specification Form;

FIG. 7 shows a typical Direct Send Form;

DESCRIPTION OF POSSIBLE PREFERRED EMBODIMENTS

Figure 1:
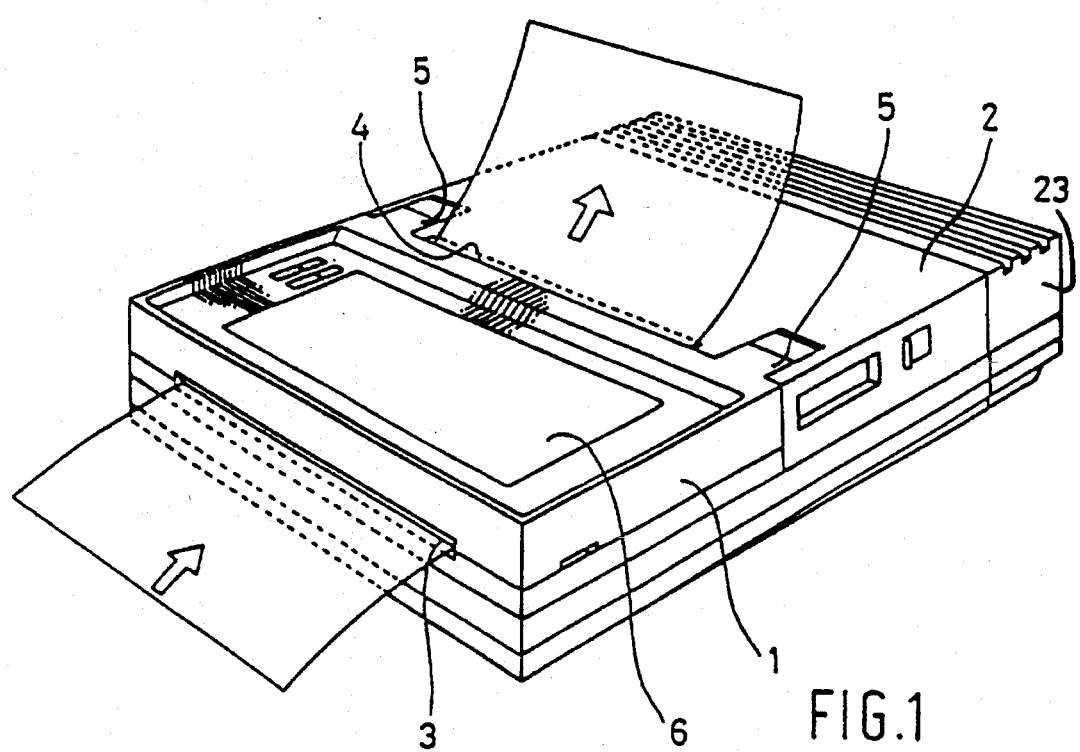
FIGS. 1, 2 show a system according to the invention.
Figure 2:
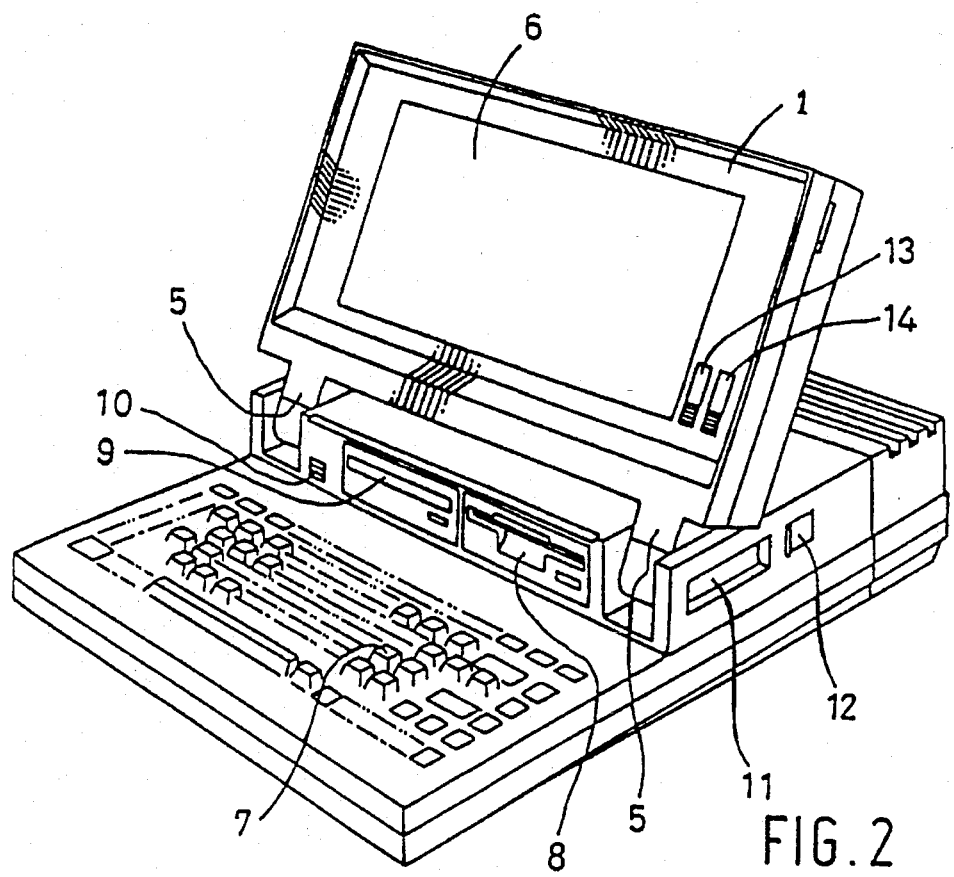

Hereinafter, first, the general set-up of the hardware is disclosed; next, various form layouts are shown; finally, additional considerations are given. Now, FIGS. 1, 2 show a device for use with to the invention, in particular according to U.S. Pat. No. 5,115,374 herein briefly abstracted and for the remainder, incorporated by reference. The figures show a full-fledged combination of collapsible lap-top computer and on-board fax facility. However, for simplification, particular features could be omitted, while still realizing various advantages according to the invention:

leave out fax network attachment;

lower display capability, or replace complete display by hard-copy facility only;

lower keyboard capability to just so much as necessary.

A different solution would be in general a stand-alone facsimile device with a few data processing features added according to the invention, for so allowing certain more fax-oriented functions. Even the designing of new user-specified forms could be suppressed, so that only a fax device proper would remain.

Various of the above features and suppressions could be combined to realize a device operating as a peripheral device to a computer of appropriate processing power. In FIGS. 1,2 the following legends are used:

1: display module

2: main body

3: paper feed slot

4: paper release slot

5: display connector

6: display panel/touch screen

7: keyboard

8: floppy disk drive

9: CD ROM drive

10: power switch

11: retractable handle

12: mouse connector

13: contrast control knob

14: brightness control knob

23: power supply

Since a facsimile mechanism is provided on the opposite part of a display module from a display panel, in the portable computer, the information such as pictures can be transmitted to other facsimile machines or computers.

In addition, a touch panel is provided on the surface of the display panel. Manuscripts can be sent to other locations after setting the manuscript paper irrespective of the display module being raised or closed. On the other hand, the data output of the scanner is connectable to the input of the data processor, thereby allowing storage of the information scanned, inclusive of extraction of mark indicia detected, optical character recognition, directory formation, reformatting, table look up etcetera. The advantages of the present invention lie in the connection of a fax type scanner with certain of the data processing features listed, whereas the device may commercially be similar to a personal computer, to a facsimile device, or to one of these upgraded with various features according to the invention.

The portable computer shown principally comprises display module 1 and main body 2. Display module 1 has display panel 6 using colour liquid crystal provided on the first major side of it and a pair of display connectors 5. Brightness control knob 13 and contrast control knob 14 are provided at the side of liquid crystal display panel 6. The display panel 6 on the surface of which a touch screen is secured is provided on the first major side of display module 1, while there is provided only a hard wall on the second major side of display module 1. A facsimile mechanism is arranged on the second major side of display module 1. The facsimile mechanism comprises a manuscript paper path arranged between paper feed slot 3 and paper release slot 4, four small paper guide rollers and a large paper guide roller which are provided along the manuscript paper path, a motor driving the guide rollers, a paper feed sensor and an image scanner. Also, a communication modem is provided within the main body.

Display module 1 is detachable, and can be connected with the main body 2 by hinge means in either way that display panel 6 faces the outside as shown in FIG. 1, or in a way that it is set in reverse as shown in FIG. 2. Electronic connection between main body 2 and display module 1 is made by display connectors 5. When display module 1 is set in such a way that the second major side of display module 1 faces the outside in a closed position as shown in FIG. 2, colour liquid crystal display panel 6, keyboard 7, etcetera can be protected from outside shock.

The keyboard 7, 3.5 inch CD ROM drive 9, 3.5 inch floppy disk drive 8 and power supply are provided in main body 2. Furthermore hard disk drive, mother board on which CPU, memories, a facsimile adapter, communication modem, etcetera are provided. Mouse connector 12 and retractable handle 11 are provided on the right side wall of main body 2, while telephone line modular jack and handset modular jack are provided on the left side wall of it. In addition there are provided a printer (facsimile and/or character) connector, RS-232C connector, analog RGB connector, etcetera on the rear side. Power supply 23 is designed in such a way that either AC supply or re-chargeable batteries are usable.

DESCRIPTION OF VARIOUS FORM LAYOUTS IN A FACSIMILE ENVIRONMENT

Hereinafter, various form layouts are discussed that are useful in a fax environment. In another environment, the form size, the various user indicia boxes, and various text matter on the form sheet could have completely different layout and use.

FIG. 3 shows a typical so-called SmartFax List Send Form, that may have the conventional European A4 format. The two alignment symbols in the upper corners allow the data processing means to recognize a form as such and are also used to deal with image distortion effects induced by the scanning, paper handling and/or earlier printing. The sequence of black and white code squares, the white ones merging with the background, uniquely identify a particular form. Two additional alignment symbols are used to deal with the image distortion effects. Through these format calibrating and identification items, the data processing knows where to expect what information on the form. For handling the form, the open squares or other user completable fields are recognized and their contents identified, such as a marking, character, or other particular sign. The form in question lists an array 49 of standard destinations, each by means of a small square and a name or other indicator. A dash or other sign will activate the associated destination. A further square 50 allows to indicate the number of pages that is OCR-recognized through the scanning, in the range 1 through 9. A final, smaller block 52 indicates whether fine or coarse scanning resolution applies, particularly, with respect to the transmission. The lower area of the sheet can be used for any information the user wants to send, including text, sketches, pasted-on material such as photographs, and other.

Figure 4:
FIG. 4 shows a fax generated from the form of FIG. 3.

FIG. 4 shows a facsimile sheet generated on the basis of a filled-in specimen of the form according to FIG. 3. Apart from various standard elements, such as sender firm logo and form name 53, the senders name, address and other data 54 have been superposed, the addressee's name, etcetera 56 have also been printed as a representation of the dashed block in FIG. 3, as being copied from an address directory. The copy box remainder of the sheet 58 carries a true copy of the information that the transmitter had added onto FIG. 3.

FIG. 5 shows a typical Address Specification form, which effectively allows update of the address directory, supra. The data on the Existing List Abbreviation allows updating of the address directory in three different ways: to add an entry, to modify an entry, and to delete an entry, respectively. Generally, if field 60 is empty, the system expects a new entry. If field 60 is filled in, but the remainder is empty, the system undertakes a delete. If field 60 is filled in, and the remainder is not empty, an update is undertaken.

A possible, somewhat more complex, procedure is the following. The data on the Existing List Abbreviation Field are compared to the entries of the actual directory: if this field is left empty, the remainder of the form may relate to a new entry. If this field produces a single equality in the actual directory., the associated item can be modified or deleted. If this field is filled in, but no equality is found, the signal gives an error message to the user. Next, if the New List Abbreviation field 62 is filled in and field 60 was either empty or caused an equality signalization, the contents of field 62 are compared to all entries in the directory. This comparison may not yield an equality, except when fields 60, 62 have identical contents. An unallowed equality will again produce an error message to the user. An empty field 62 will control a delete from the directory. A filled in field 62 will control a new or an amended entry to the directory. This is completed by filling in a New Fax Number in box 64, a New Name in box 66, and a New Address/Organization identifier in box 68. All fields 60–68 are OCR recognized before further processing. An unrecognized character will again cause an error message to the user. In an update, items that remain the same may be left open.

Figure 6:
FIG. 6 shows a typical Settings Form.

FIG. 6 shows a typical settings form that specifies the sender in block 70, and depicts a facsimile header on the lower part of the sheet. This header generally is stored completely as a bit pattern, so that complete freedom exists for layout.

Figure 8:
FIG. 8 shows a fax generated from the form of FIG. 7.

FIG. 7 shows a Direct Send Form that is applied to a seldom addressed destination. This form contains a fax number field 80, a page number field 82, a fine/coarse field 84, and a copy box field for unformatted data 86. FIG. 8 shows the facsimile sheet generated from FIG. 7 as actually generated.

NON-FACSIMILE USAGE

Now, the disclosure supra has been generally directed to the aspect of semi-automatically transmitting facsimile matter presented as a form. Various other applications would be feasible as well, wherein fixed format information would be combinable with user-specifiable information, and especially so where the latter could be either according to yes or no, or as characters/digits, etcetera, or as information that is left uninterpreted. The latter may again be according to standardized format, but alternatively it may be free-form, such as comments, sketches, or even in the form of paste-on material such as photographs, receipts, unused tickets and others. Such forms could be used in many instances, such as forms used in an inquire (market research, satisfaction assessment)

declarations (for customs, travelling costs)

order forms cross-word puzzles, and many others. The inexpensive form handling machine would become an indispensable tool.

FURTHER CONSIDERATIONS

The use of the present invention is most advantageous with forms that are tailored for automated form processing: this raises appreciably the efficiency and accuracy. One particular dichotomy is between static parts of the form that are present on each form of a particular category, and dynamic parts that are added by the form user. These dynamic parts are restricted to so-called boxes, which in the embodiment are rectangular. Generally, the boxes have printed (static) edges. Mark boxes are typically 0.2×0.2 inch and only a mark therein is recognized, independent of the shape of the mark that may be dash, cross or even a character. Character boxes are 0.3×0.3 inch and may contain a single character or symbol. The machine should of course know the applicable alphabet. Copy boxes may have any dimension, but in practice are much larger than the other types, and the processing of the content is not an automatic feature of the device according to the invention, but forms part of the application in which the information is used. Such processing may therefor be remote in space, or in time, or in organizational level. For fax transmission, it could be run-length coding. For processing of the text, OCR could be applied off-line, so that no timing constraints would be present. If pictures, they could be later processed, updated, etcetera in a graphics environment. All of these, however need not underlie the restrictions of the appliance of the present invention.

Now, the difference between the form as scanned and as generated are the filled in boxes. Furthermore, there are imperfections due to printing, scanning, and as the case may be, copying. Various effects are random noise, thinning or thickening of lines, stains and other externally generated interferences, mispositioning of the sheet material, skewing of the scanning with respect to the paper feed and stretching or shrinking caused by the optical scanning. Distortions in the shape of copy boxes may be ignored. The positions of all other boxes and of the form identifier data are predicted from the measuring of the format calibrating items. Matching of the format calibrating items is done in an area of 0.8×0.8 inch and all distortions, etc. are considered to be linear effects. The items themselves have a diameter of 0.2 inch. The calibration items are surrounded by a white area, which is large enough to contain the largest possible displacement. The detection is done by counting the numbers of black pixels in row and columns of their expected region and determining the maximum or the best possible match. All expected coordinates can now be calculated relative to the centre of gravity of the items whereas scale and coordinate directions are calculated from the vectors from the centre of gravity to the items. For the determination of the form identifier, the two upper items would be sufficient. The lower items can be at the lower end of the sheet, or if the lower part of the form only contains a copy box, just above that copy box. If necessary, the number of calibration items may be 6, 8, or higher. If a mark box is found, its black pixels are counted while leaving off the edge. For really ascertaining a mark, within an effective area of 0.13×0.13 inch at least 5% of the pixels should classify as black. In character boxes at least 1% of the pixels should classify as black for the recognition process to trigger. Clipping can be done within a field that is slightly smaller thin the box (as with the mark boxes), but in some cases it is advantageous to make the effectively inspected field somewhat larger than the lined box: this however, necessitates also recognizing the edges, that must subsequently be subtracted from the character information to be recognized. If the copy box has a border line, it is clipped a little inside, just as the earlier boxes. If no border line exists, only the expected area is clipped. Now, the inventors are aware of address sorting of letters by postal organizations that uses scanning and optical character recognition. However, this is a one-type usage, whereas the invention allows to specify many different types of form, each of which is handled in a specific way that is defined by the application. Generally, the concepts of the present invention are considered most likely candidates for small-scale use: many different forms, freely choosable format, large fractions of the area can be excluded from further processing directly at the scanning.

FIG. 9 is a flow chart of the operation of a system according to the invention. Generally, the left column of flow chart blocks relates to the invention proper. However, if for any reason, the invention does not apply or is not effective, the system exits to a default procedure, wherein faxing remains operational, albeit with the smart features disabled. This means that only straightforward faxing is possible, wherein the user must enter each and every item on the machine keyboard, such as the destination, the number of pages, and in general, all those items that the smart machine according to the invention may recognize from the optical reading of the form sheet proper.

Now, block 100 is the start block, wherein the machine executes power-on, actuates the paper feed mechanism, and in short, does all things that any standard fax machine would need to do. Moreover, the various form parameters according to the user specifications are made accessible, such as the positions where the various user defined fields are supposed to be. Next, block 102 detects occurrence of a form and in fact, compares to a waiting loop. If the entry of a form sheet is detected (Y), in block 104 the form is scanned, and the pixel values are stored. In block 106 the calibrating diamond figures are searched for and their relative distances are measured. If they are not found, or if their relative distances are out of range (NOK), the system goes to the default procedure in block 120. Inasmuch as the default procedure by itself is conventional, it has not been further detailed for brevity. If the calibrating items have been correctly located, the system goes to block 104 and calculates where on the form sheet to expect the prescribed identifier field. Next, the associated range of the sheet is scanned in block 110. This may be effected either in memory, where the sheet data had been stored, but another feasible solution is to do this on the physical sheet itself. In block 112 it is detected whether the identifier data are recognizable and do conform to one of various categories that have been declared by the user of the system. Again, if this procedure fails, the system exits to the default procedure (120). If the identifier data are O.K., the system in block 114 from the recognized data calculates where on the form sheet to expect the prescribed user indicia boxes. In block 116 it is detected whether the user indicia boxes are recognizable and do conform to one of various categories that have been declared by the user of the system. If they cannot be found, or do not conform, the system again exits to the default procedure 120. Finally, in block 118, the user indicia boxes are read, their contents are recognized, and the command or information thereof is executed or used otherwise, as the case may be. Finally, in block 122 the procedure is terminated, for example in that the system goes into an energy saving standby condition. The above described procedure is an elementary embodiment, and may be amplified in many different ways that after reading of the above disclosure would be obvious to the skilled art practitioner, such as:

executing a retry if a first attempt fails cutting off the procedure in case of a higher level default, such as when a fax addressee had been correctly listed but in reality has ceased to exist.

We claim:

1. A form handling system, comprising acceptance means for physically accepting a form sheet with respect to said system, optical scanning means for scanning said form sheet, form processing means including data storage means interconnected to said scanning means for storing data for generating a set of forms of respective types, first recognizing means for detecting a plurality of physically sparse format calibrating items at a perimeter of said form sheet, measuring a separation between said items, and calibrating the form processing means to an expected form appearance based on the separation between said items;

second recognizing means fed by said first recognizing means for detecting and recognizing directly machine-readable form identifier data, which identifies a selected form from the set, the form identifier data being in a prescribed identifier field of said form sheet, said prescribed identifier field being located according to said expected form appearance;

third recognizing means, fed by said first and second recognizing means, for locating, according to said expected form appearance, one or more user indicia boxes proper to the selected form and forwarding indicia data of those indicia boxes for processing by said data processing means.

2. A system as claim 1 wherein the third recognizing means recognizes both indiscriminate marks in mark indicia boxes and specific characters in character indicia boxes proper to the form so identified.

3. A system as claimed in claim 1 and having transfer means fed by said first and second recognizing means for recognizing one or more copy boxes each in a respective copy box field proper to the form so identified and directly transferring any scanned information therefrom to said data storage means.

4. A system as claimed in claim 1 wherein the third recognizing means recognizes user indicia in a user indicia box array.

5. A system as claimed in claim 1, wherein said first recognizing means recognize at least four format calibrating items substantially at respective extremities of a fractional subform of said form.

6. A system as claimed in claims 1 and having printing means for printing such form conforming to internally stored information in said system for so realizing a said form sheet that is subsequently acceptable to said system.

7. A system as claimed in claim 1, wherein said data processing means are arranged for upon processing said user indicia data therefrom deriving amendation data to said internally stored information.

8. A system as claimed in claim 7, wherein said data processing means are arranged for updating through said amendation data said internally stored information as a directory, of which a particular directory item is thereupon selectable through a further user indicium on an associated directory select form.

9. A system as claimed in any of claim 1 and having transfer means fed by said first and second recognizing means for recognizing a particular copy box field proper to the form so identified and transferring any scanned information therefrom to a facsimile attachment means for attachment to a facsimile network, said system having reformatting means for converting a particular detected mark from a mark box specifier array to an associated prespecified destination address for said scanned information.

10. A system as claimed in claim 9, wherein said reformatting means comprises a fax destination directory, comprising said prespecified destination address.

11. A system as claimed in any of claim 1 and wherein at least part of said processing means is remote from said acceptation means and said optical scanning means.

12. A user specified form as generated by a system as claimed in claim 6.

13. A form sheet having physically sparse format calibrating items substantially at a perimeter thereof, directly machine readable form identifier data in an identifier field thereof and allowing physical handling in a system as claimed in any of claims 1 to 11 or 14 and in particular interfacing to said third recognizing means.

14. A method for generating customized forms comprising the steps of optically scanning a form sheet;

in data processing means:

first recognizing a plurality of physically sparse calibrating items at a perimeter of said form sheet;

measuring a separation between said items;

calibrating to an expected form appearance based on the separation between said items;

locating and second recognizing form identifier data, based on the expected form appearance;

retrieving stored data related to a selected form based on the form identifier data;

locating and recognizing indicia data, proper to the selected form, in user indicia boxes, said locating and recognizing being based on the retrieved data and the expected form appearance; and outputting a customized output form generated from the stored data related to the selected form and the indicia data.

* * * * *